United States Patent [19]
Meyn

[11] Patent Number: 4,648,156
[45] Date of Patent: Mar. 10, 1987

[54] METHOD AND APPARATUS FOR REMOVING THE BREAST FLESH FROM A POULTRY CARCASS

[76] Inventor: Pieter Meyn, Noordeinde 68C, 1511 AE Oostzaan, Netherlands

[21] Appl. No.: 751,036

[22] Filed: Jul. 1, 1985

[30] Foreign Application Priority Data

Jul. 6, 1984 [NL] Netherlands ......................... 8402165

[51] Int. Cl.⁴ .............................................. A22C 21/00
[52] U.S. Cl. ............................................. 17/46; 17/11
[58] Field of Search .............................. 17/11, 46, 1 G

[56] References Cited

U.S. PATENT DOCUMENTS 3,130,445 4/1964 Segur .................................. 17/11 X
3,665,553 5/1972 Colosky .................................. 17/11
4,557,017 12/1985 Gasbarro .............................. 17/11

Primary Examiner—Willie G. Abercrombie
Attorney, Agent, or Firm—Dority & Manning

[57] ABSTRACT

A method for removing the breast flesh from a poultry carcass is provided in which, prior to the removal of the breast flesh, the top of the clavicle of the carcass is removed. For carrying out this method an apparatus is provided, having carrying elements for each carcass, said carrying elements being movable along a conveyor track and means positioned next to said conveyor track for separating the breast flesh and the carcass wherein ahead of the separating means a processing device is provided for removing the top of the clavicle of the carcass. In a preferred embodiment said processing device comprises a cutting die that cooperates with a counter-knife.

32 Claims, 30 Drawing Figures

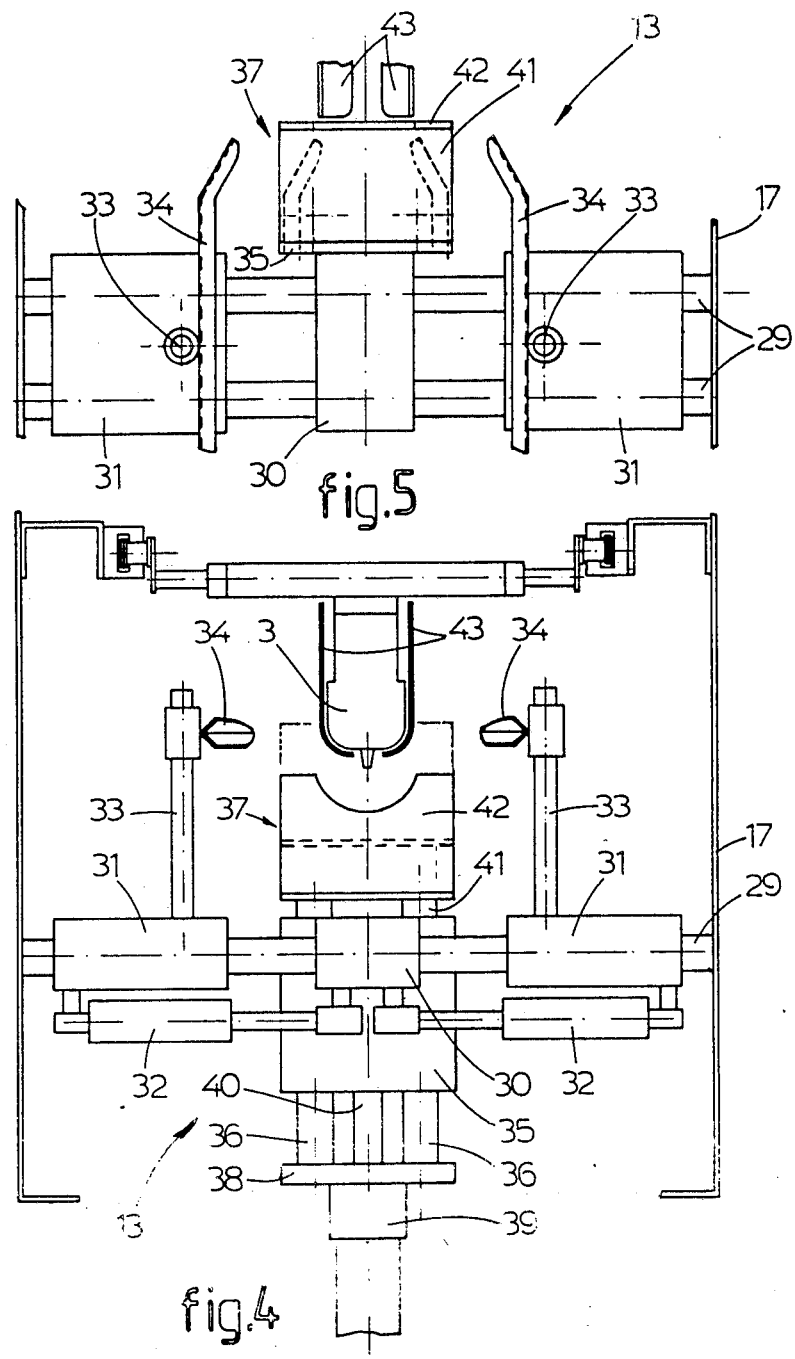

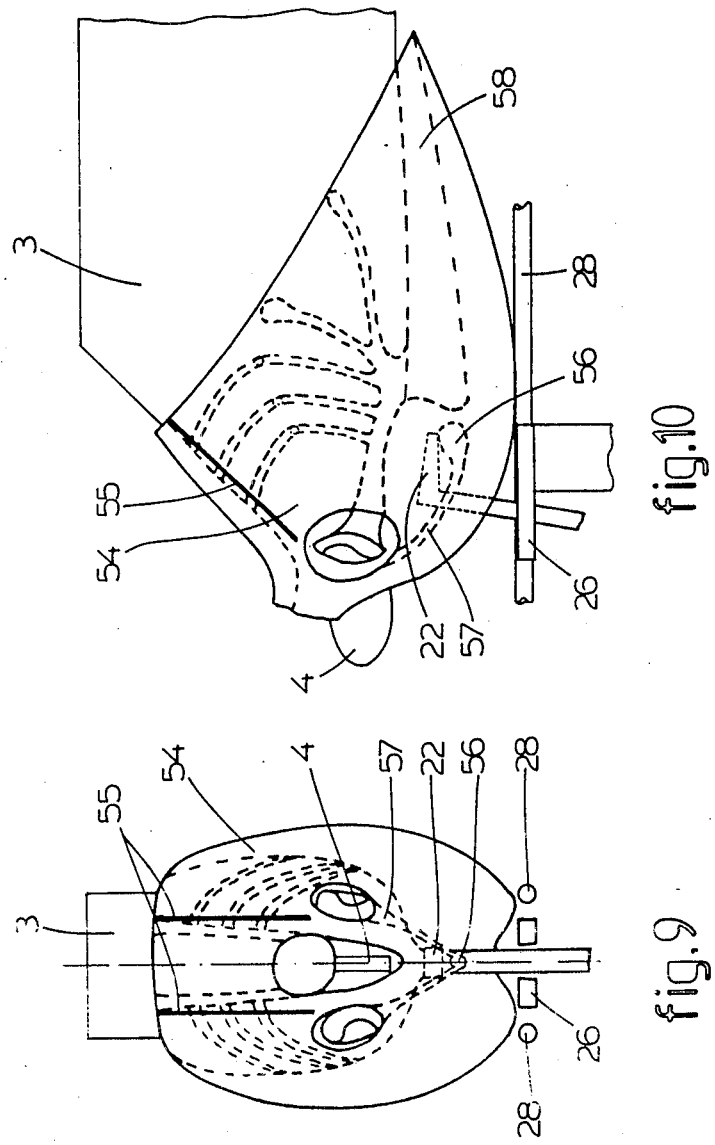

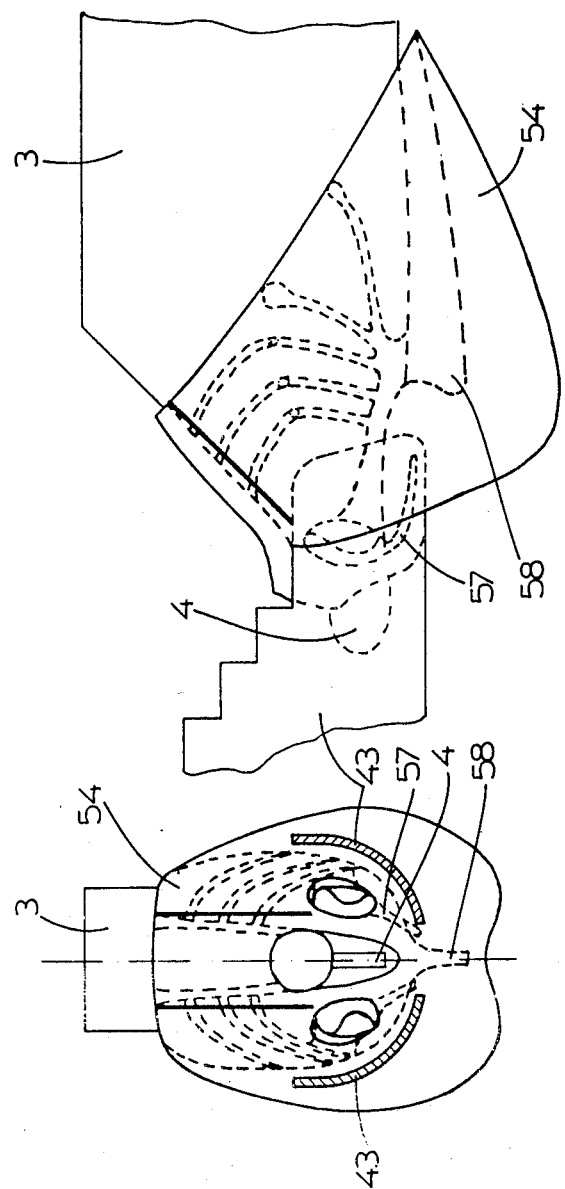

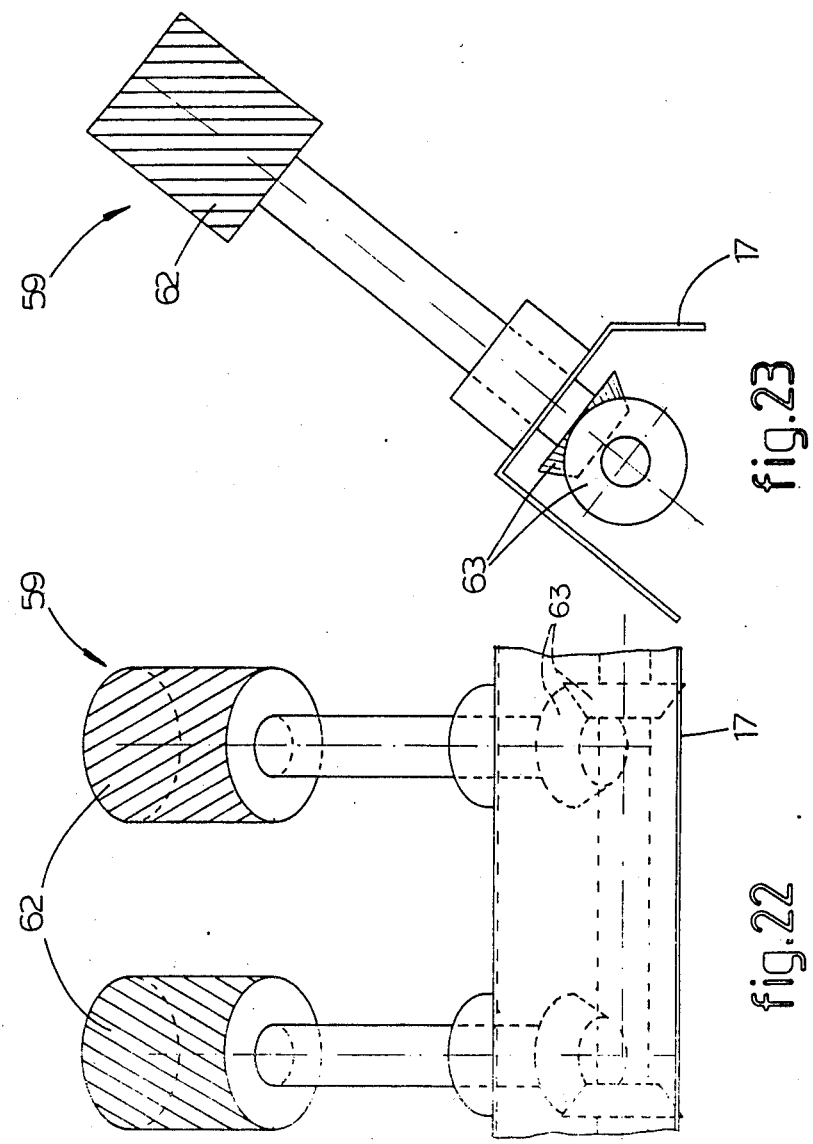

METHOD AND APPARATUS FOR REMOVING THE BREAST FLESH FROM A POULTRY CARCASS

The invention relates to a method for removing the breast flesh from a poultry carcass; moreover, the invention relates to an apparatus for carrying out this method.

In a known method the breast flesh is severed manually from the poultry carcass by a combination of cutting and pulling. In this case especially the clavicle is removed carefully. This clavicle is V-shaped and is embedded in the breast flesh wherein the ends of the clavicle act to keep the wing joints apart during flying. The top of the clavicle is positioned near to the leading end of the sternum of the poultry.

When the clavicle and the breast flesh are removed manually a considerable part of the breast flesh is wasted because flesh remainders stick to the clavicle. Moreover, the removal of the clavicle is time-consuming.

In another known method in which an automatized process is used the removal of the clavicle also appears to lead to big problems. Because an important part of the breast flesh is provided between the sternum and the clavicle, the clavicle is damaged in an uncontrolled way during an automatized removal of the breast flesh so that bone fragments can remain in the breast flesh. When it is attempted to leave the clavicle undamaged a great percentage of the flesh is left behind on the carcass. Further it is often demanded that the breast flesh, after removal, should be damaged as little as possible so that an attractive product is obtained. Moreover, the need exists for a breast flesh section forming one single part.

It is an object of the invention to provide a method for removing the breast flesh from a poultry carcass wherein the mentioned drawbacks do not occur but with which it is possible to remove the breast flesh quickly in a simple, but nevertheless effective way, while the amount of breast flesh that remains on the poultry carcass is minimal and the chance of bone fragments in the breast flesh is minimized.

Therefore, the method according to the invention is characterized in that prior to the removal of the breast flesh the top of the clavicle of the carcass is removed.

Because the top of the clavicle is removed the then remaining half bones can be pressed away easily along the rib cage during the removal of the breast flesh, when the breast flesh is removed from the poultry carcass.

The invention also relates to an apparatus for carrying out the method with carcass carrying elements that are movable along a conveyor track and means positioned next to the conveyor track for separating the breast flesh and the carcass.

This apparatus is characterized in that, ahead of the separating means, a processing device is provided for removing the top of the clavicle of the carcass.

In a preferred embodiment of the apparatus according to the invention the processing device comprises a cutting device that is movable between a first position in which the cutting device is positioned between the corresponding carrying element and the top of the clavicle and a second position in which the cutting device is positioned at that side of the clavicle that faces away from the carrying element.

Due to this motion of the cutting device the top of the clavicle is removed quickly and effectively.

According to another convenient embodiment of the apparatus according to the invention the separating means comprise a first scraping device placed behind the operating device, said first scraping device extending at least along the width of the carrying element and being movable to and fro along the longitudinal plane thereof from and towards the carrying element and having at its end facing the carrying element, a hollow shape.

This first scraping device partially severs the part of the breast flesh positioned near to the sternum of the carcass from the corresponding part of the sternum. The hollow shape of this first scraping device is adapted to the shape of the carcass to be processed.

According to another preferred embodiment of the apparatus according to the invention the separating means further comprise two guiding elements placed immediately ahead of the scraping device at both sides of the corresponding carrying element and extending substantially in parallel with the corresponding conveyor track section, said guiding elements being movable to and fro between a first position in which the guiding elements are positioned sideways very close to the carrying element and a second position in which the guiding means are positioned sideways at a greater distance of the carrying element.

These guiding means press the poultry carcass firmly against the corresponding carrying element so that the operation of the first scraping device is improved in an effective way.

According to a further advantageous embodiment of the apparatus according to the invention the separating means further comprise two stripper plates that at both sides of the corresponding carrying element are placed behind the scraping device and that extend in parallel with the corresponding conveyor track section, said stripper plates having in cross-section a curved shape.

These two stripper plates remove the part of the breast flesh of the carcass lying above the sternum. The curved cross-sectional shape of these stripper plates is adapted to the shape of the carcass to be processed.

According to a further advantageous embodiment of the apparatus according to the invention the stripper plates each are provided with a recess, and next to each stripper plate a pivotable scraping rod is provided, a free end of which is movable into the recess of the corresponding stripper plate.

The scraping rod is meant to sever the breast flesh from the sides of the sternum.

When, according to another preferred embodiment of the apparatus according to the invention, a cutting-loose device is placed beyond the recesses below the stripper plates, the breast flesh finally can be severed from the lower side of the sternum whereafter the breast flesh can be removed in its totality from the poultry carcass.

The invention will hereafter be explained further with reference to the drawing in which a number of embodiments of the apparatus according to the invention are shown.

FIG. 4 shows the first scraping device of the apparatus according to FIG. 1, as seen in transport direction;

FIG. 5 shows a top plan view of the scraping device according to FIG. 4;

FIGS. 9 and 10 show the operation of the processing device according to FIG. 2 and 3;

Figure 1:
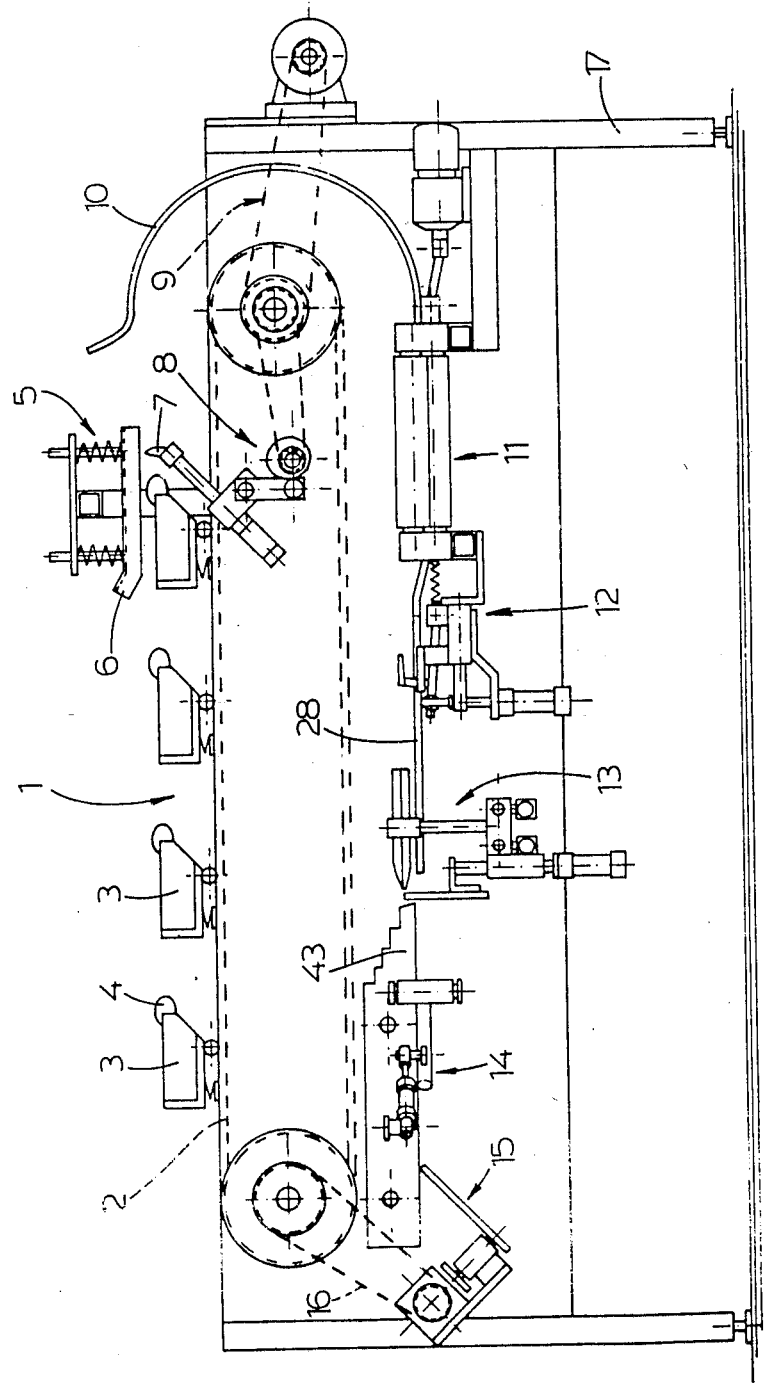
FIG. 1 shows a side elevational view of a first embodiment of the apparatus according to the invention.
Figure 7:
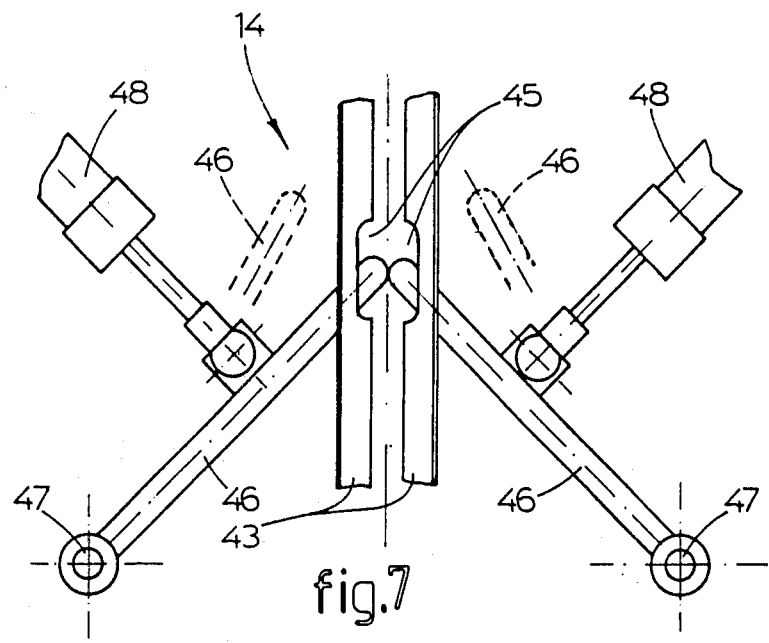
FIG. 7 shows a top plan view of the stripper plates according to FIG. 6.
Figure 6:
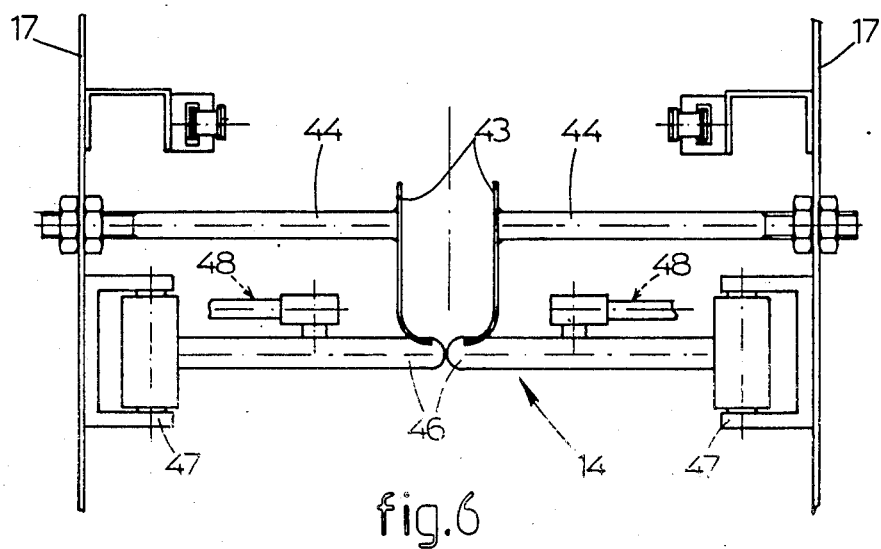
FIG. 6 shows the stripper plates of the apparatus according to FIG. 1, as seen in transport direction.
Figure 8:
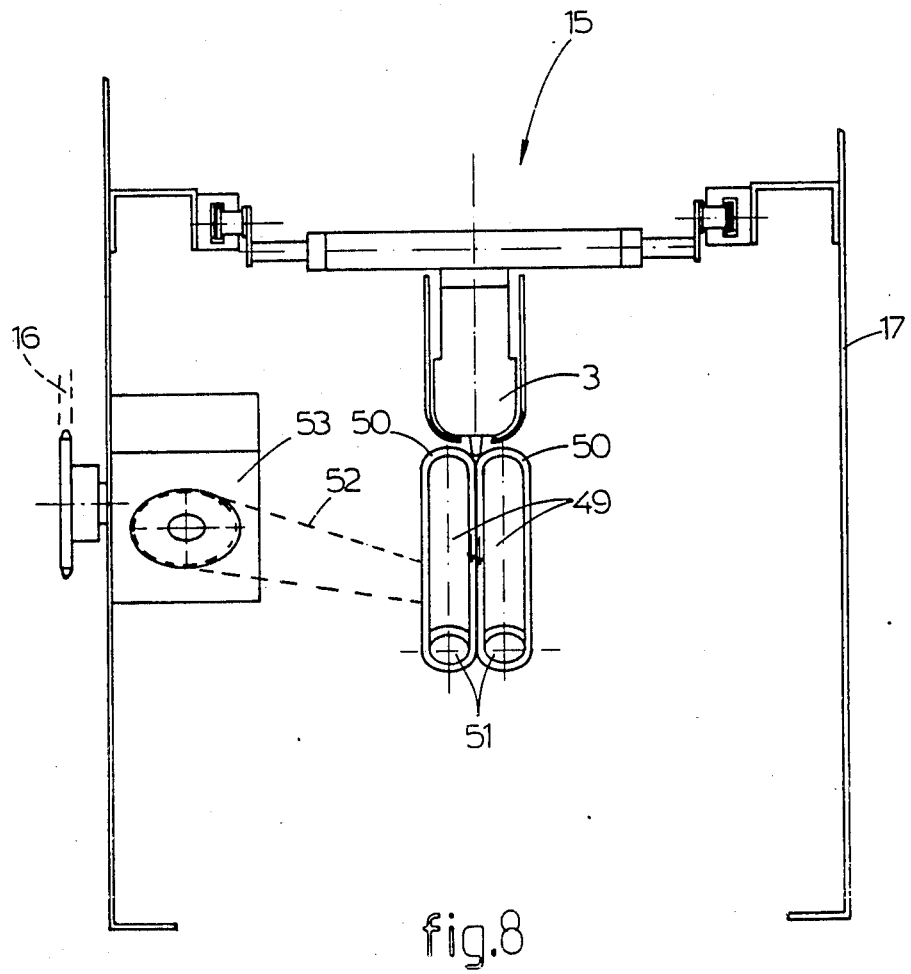
FIG. 8 shows the cutting-loose device of the apparatus according to FIG. 1, as seen in transport direction.
Figure 18:
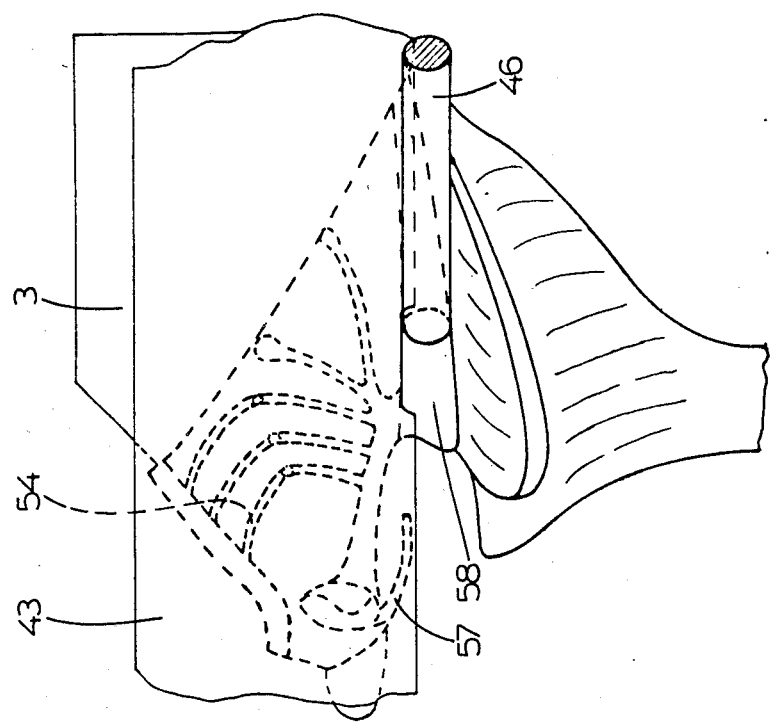
Figure 17:
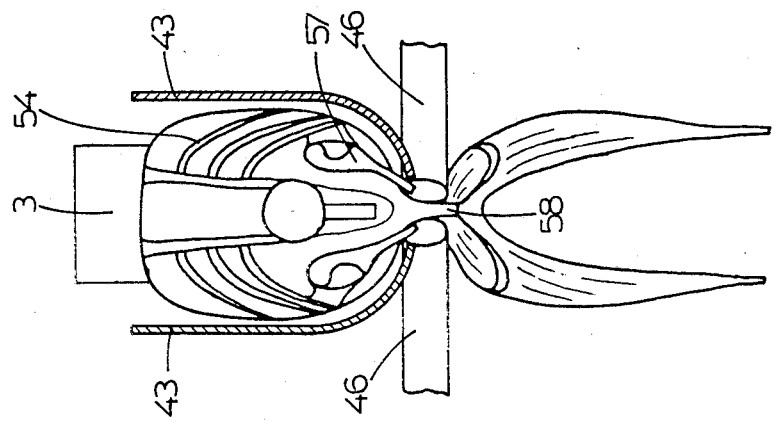
Figure 20:
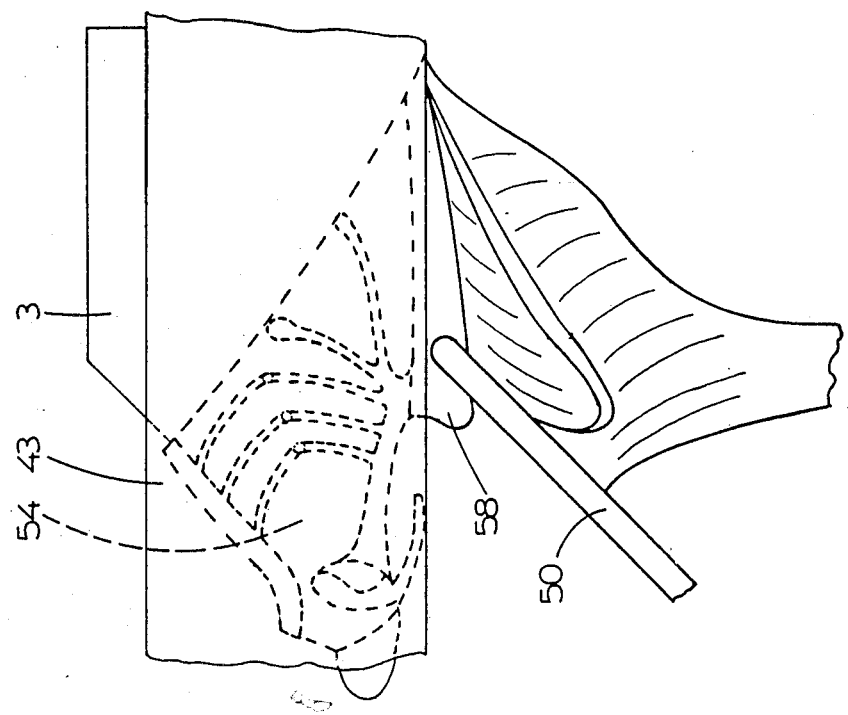
Figure 19:
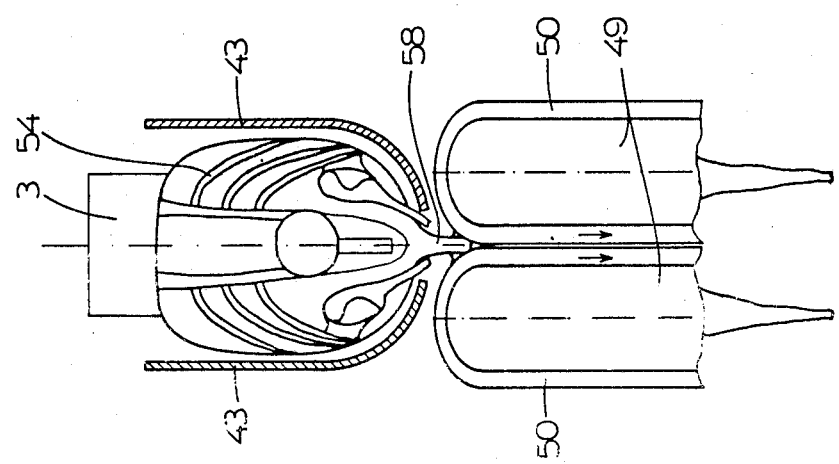
Figure 21:
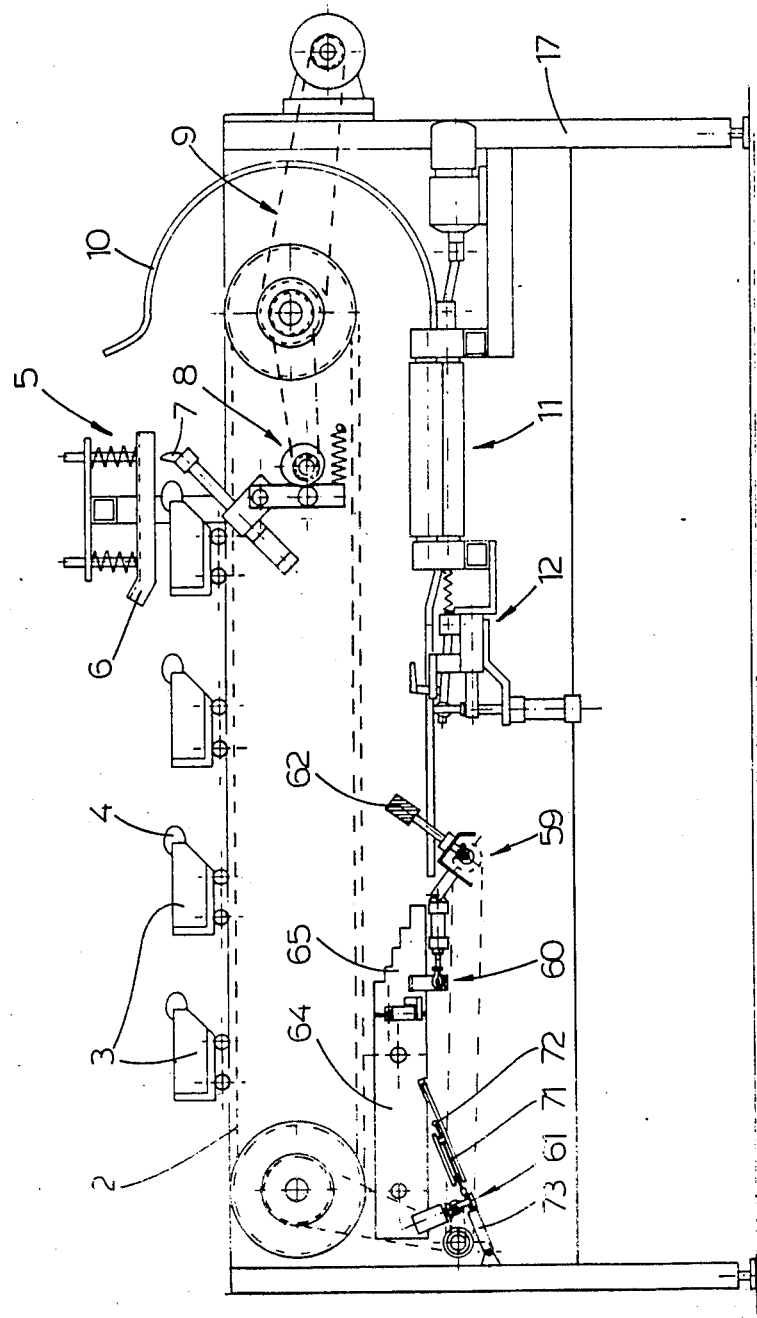
Figure 25:
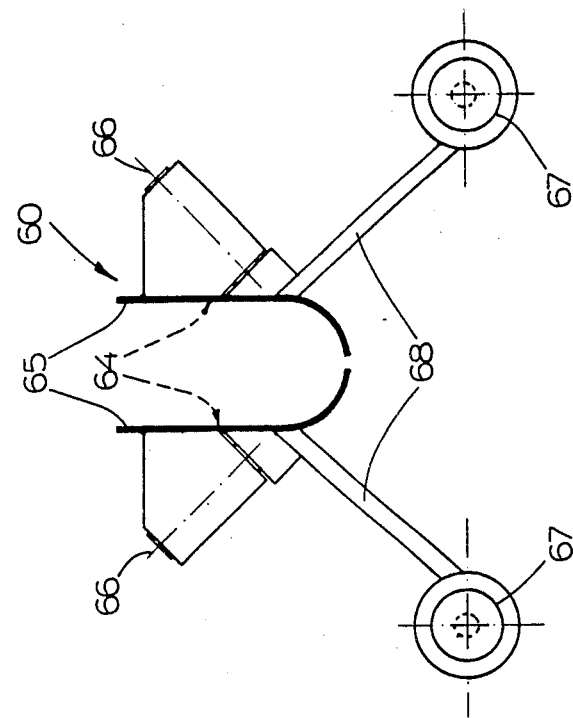
Figure 24:
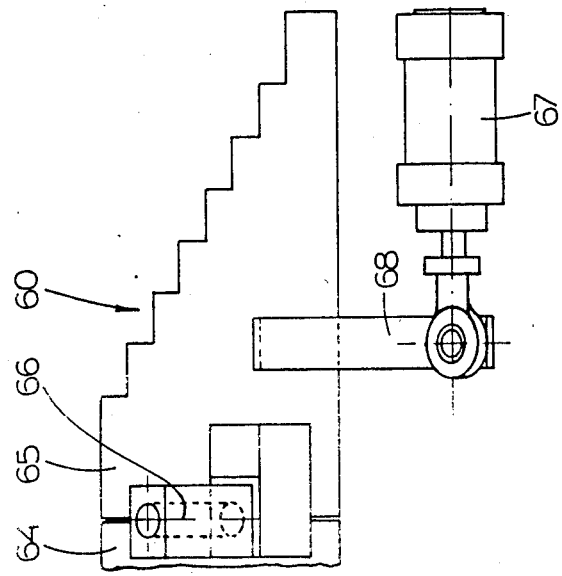
Figure 26:
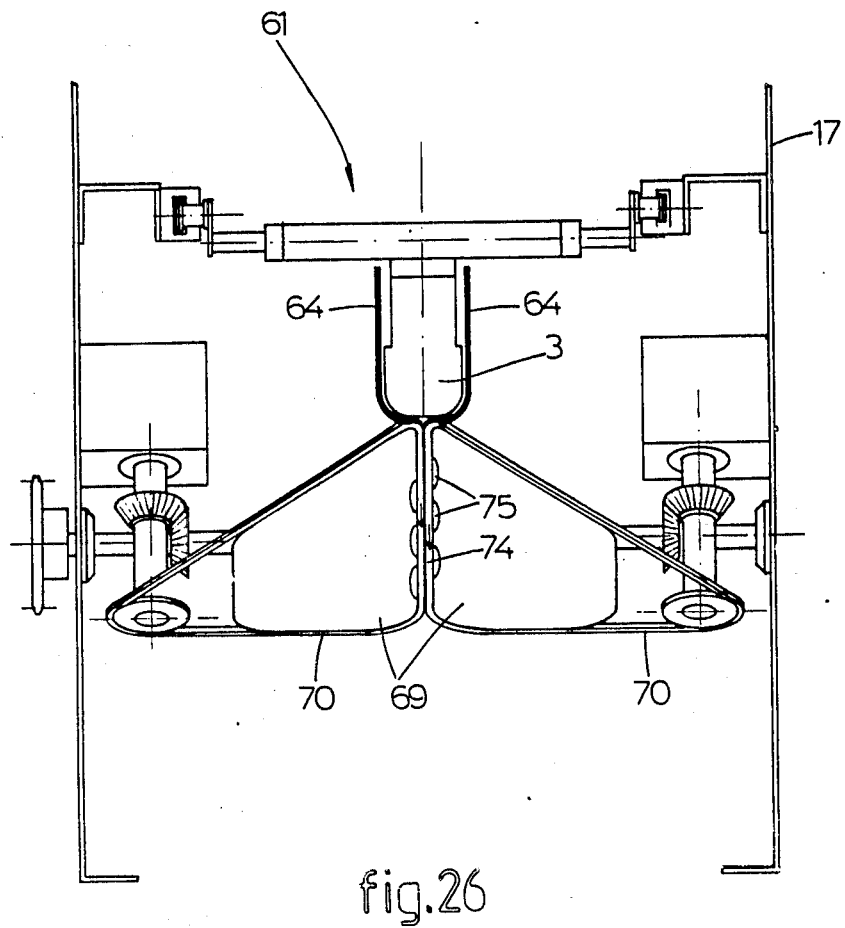
Figure 28:
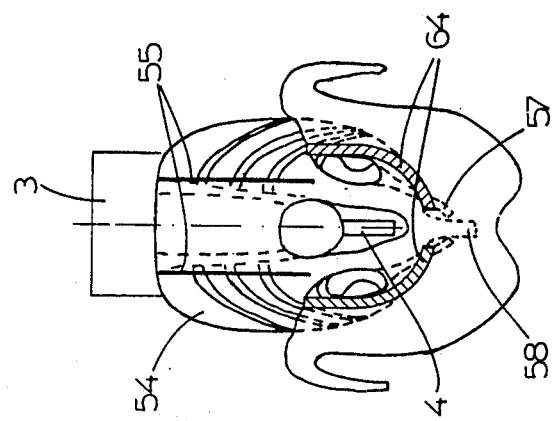
Figure 27:
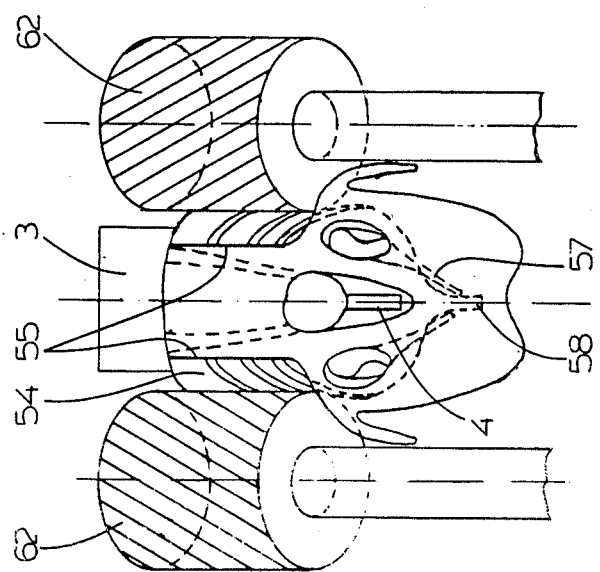
Figure 30:
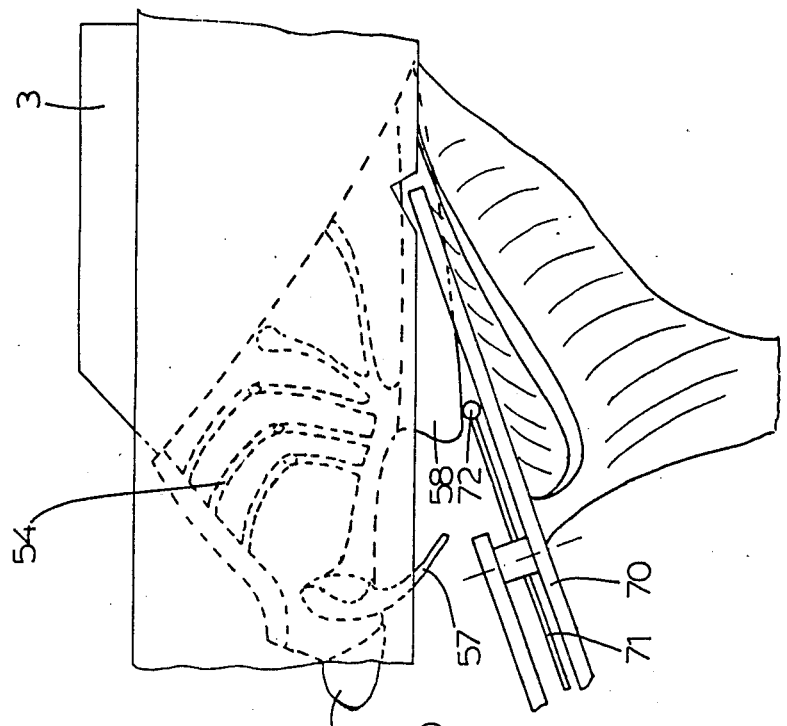
Figure 29:
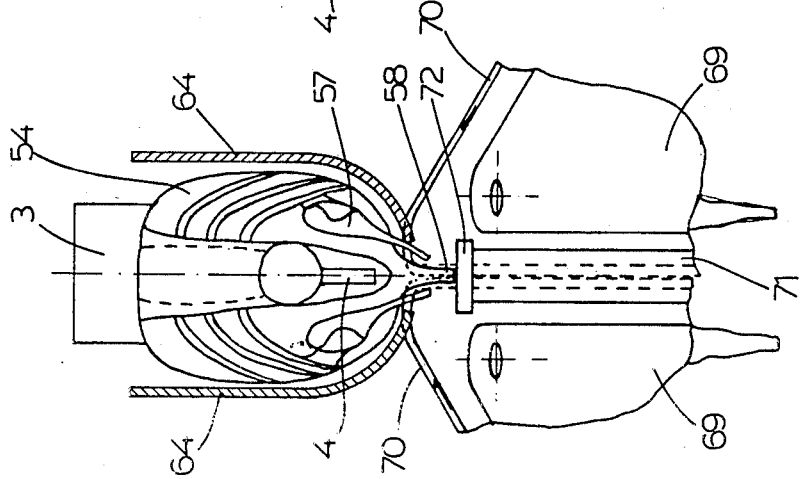

FIG. 13 until 16 show the operation of the stripper plates according to FIG. 6 and 7;

FIGS. 17 and 18 show the operation of the scraping rods of the apparatus according to FIG. 1;

FIGS. 19 and 20 show the operation of the cutting-loose device according to FIG. 8;

FIG. 21 shows a side elevational view of a second embodiment of the apparatus according to the invention;

FIG. 22 shows the first scraping device of the apparatus according to FIG. 21, as seen in transport direction;

FIG. 23 shows a side elevational view of the first scraping device according to FIG. 22;

FIG. 24 shows a side elevational view of stripper plates of the apparatus according to FIG. 21;

FIG. 25 shows the stripper plates according to FIG. 24, as seen in transport direction;

FIG. 26 shows a cutting-loose device of the apparatus according to FIG. 21, as seen in transport direction;

FIG. 27 shows the operation of the first scraping device according to FIGS. 22 and 23;

FIG. 28 shows the operation of the stripper plates according to FIGS. 24 and 25, and FIGS. 29 and 30 show the operation of the cutting-loose device according to FIG. 26.

The first embodiment of an apparatus 1 for removing the breast flesh from a poultry carcass shown in FIG. 1 comprises a number of carrying elements 3 for the carcasses to be processed that are movable along a schematically represented conveyor track 2. Next to this conveyor track a number of means are positioned for separating the breast flesh and the carcass. At their frontal side the carrying means 3 are provided with a projecting part 4 that is pushed through the neck-opening of the carcass.

Next to the conveyor track 2 a guiding-cutting assembly 5 is placed that, in a way known in itself, is composed of a spring biased guidance 6 and two cutting knives 7 provided at both sides of the corresponding carrying element 3. This guiding-cutting assembly 5 makes sure that at both sides of the backbone of the carcass two cuts are made in the flesh so that at that place the coherence between the carcass and the flesh is severed. The cutting knives 7 carry out a motion that is synchronized with the motion of the carrying elements 3 because these cutting knives are connected with the drive 9 of the conveyor track through a curve blade mechanism 8.

After the carrying elements 3 have passed the guiding-cutting assembly 5 they move along a curved track along a guiding rod 10 downwardly. The guiding rod 10 make sure that the carcasses do not fall off of the corresponding carrying elements 3 when these move downwardly along the curved track.

The carrying elements 3, together with the carcasses placed thereon, then reach a skinning apparatus 11 positioned next to the conveyor track and having a shape and operation known in itself. If it is desired to deliver the breast flesh with skin, such a skinning apparatus is omitted.

Immediately beyond the skinning apparatus 11 a processing device 12 is provided for removing the top of the clavicle of the carcass.

After the processing device 12, the carrying elements 3 reach a first scraping apparatus 13 and a second scraping apparatus 14. Finally, next to the conveyor track 2 a cutting-loose device 15 is provided that is connected with the conveyor track 2 by means of a schematically represented chain 16.

The whole apparatus 1 is mounted within a frame 17 that in FIG. 1 only has been represented schematically.

Because the guiding-cutting assembly 5, the guiding rod 10 and the skinning apparatus 11 are known, they will not be discussed further in detail but hereafter the processing device 12, the first scraping apparatus 13, the second scraping apparatus 14 and the cutting-loose device 15 are explained further.

Figure 3:
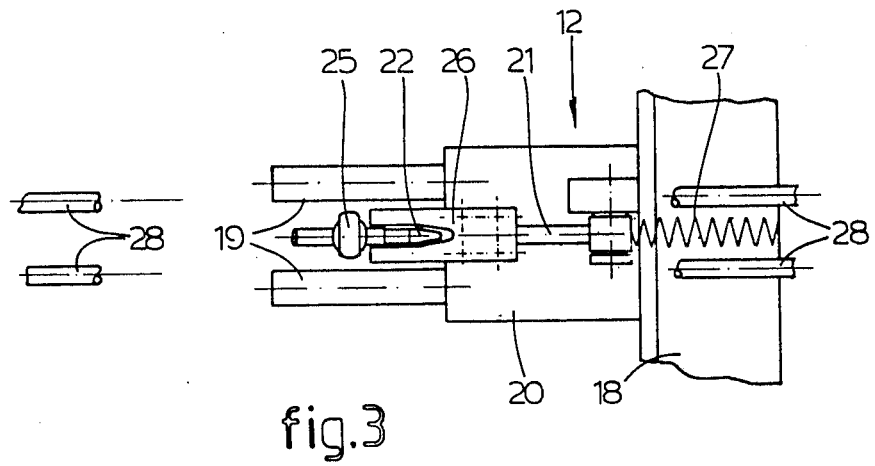
FIG. 3 shows a top plan view of the processing device according to FIG. 2.
Figure 2:
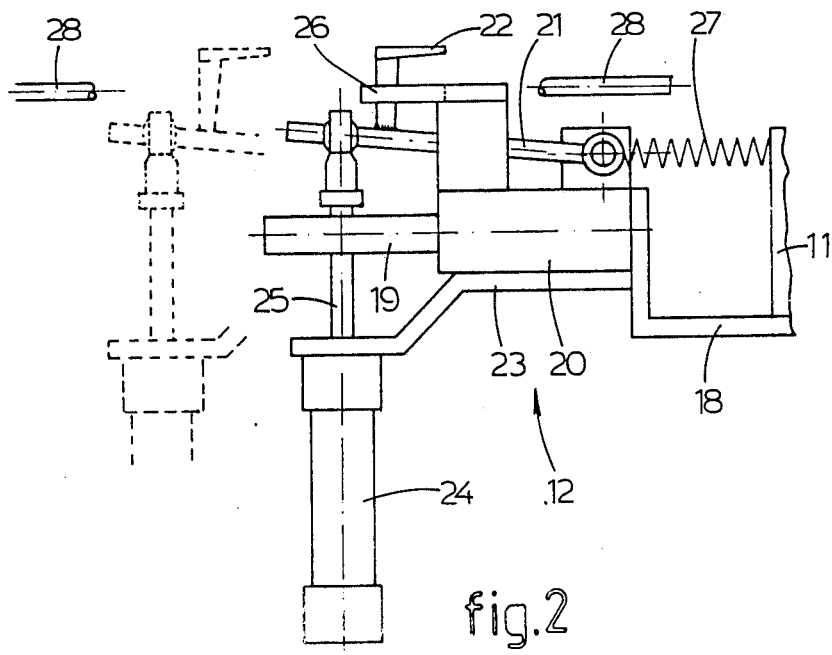
FIG. 2 shows a side elevational view of the processing device of the apparatus according to FIG. 1.

The processing device 12, shown in FIGS. 2 and 3, for removing the top of the clavicle, is connected to the skinning apparatus 11 by means of a angle plate 18. On the angle plate 18 two guiding rods 19 are mounted on which a carriage 20 is movable to and fro. The carriage 20 carries a pivotable carrying arm 21 on which a cutting-die-like cutting device 22 is provided that can engage behind the top of the V-shaped clavicle. At the lower side of the carriage 20 a jib 23 is attached at the end of which a piston device 24 is provided. The piston rod 25 of this piston device 24 engages the carrying arm 21 so that a motion of piston rod 25 results in a motion of the cutting die 22.

Besides of the carrying arm 21 the carriage 20 at its upper side carries also a counter-knife 26 that cooperates with the cutting die 22 in a cutting operation.

The carriage 20 is connected with the skinning apparatus 11 through a spring 27, said spring 27 biasing the carriage 20 against the angle plate 18.

After the skinning apparatus 11 and above the processing means 12 two parallel guides 28 extend to prevent the carcasses off falling from the carrying elements 3. In FIG. 1 it is apparent that these guides 28 start immediately beyond the skinning apparatus 11 and extend nearly to the first scraping apparatus 13. Moreover, these guides 28 have, near the skinning apparatus 11, a downwardly curved shape so that it is always ensured that they engage in a correct and gradual way the carcasses provided on the carrying elements 3.

In FIG. 2 a second position of the processing device 12 is illustrated in dotted lines. This second position is reached when the carriage by the motion of the corresponding carrying element 3 is moved a distance in the transport direction against the load of the spring 27. The position shown in FIG. 2, in which the cutting die 22 is positioned above the counter-knife 26 can, through a motion of the piston rod 25, change to a position in which the cutting die 22 is below the counter-knife 26.

Beyond the processing device 12 the first scraping apparatus 13 is provided that is shown in FIGS. 4 and 5. The first scraping apparatus 13 comprises two guiding rods 29 that are placed transversely to the transport direction, in the centre of which rods a fixed central block 30 is provided. At both sides of central block 30 two side parts 31 are provided that are movable to and fro along the guiding rods 29, said side parts each being connected with the central block 30 through a piston device 32. The side parts 31 each carry a vertically disposed rod 33 on which a guiding device 34 is provided that can be adjusted in height.

To the front of the central block 30 a second block 35 is secured, through which second block 35, two guiding rods 36 extend, that carry at their ends, lying above the second block 35, a scraping device 37 that can engage upon the breast flesh of the poultry. The guiding rods 36 are, at their other ends, secured one to another by means of a flat plate 38 on which engages the housing 39 of a piston device, the piston rod 40 of said piston device being secured to the second block 35. When the piston rod 40 is moved relative to the housing 39 of the piston device, the flat plate 38, the guiding rods 36 and the scraping device 37 will move also.

The scraping device 37 exists of a horizontal flat plate 41 that is directly connected with the guiding rods 36 and a vertically extending second flat plate 42. The second flat plate 42 has at its upper side a practically circular opening that is adapted to the shape of the corresponding carrying element 3 and the carcass carried thereby.

In FIGS. 4 and 5 also a portion of the second scraping apparatus 14 is visable already, namely, two stripper plates 43 for loosening the part of the breast flesh lying above the sternum. As appears clearly from FIG. 6, these stripper plates 43 are adjustably connected to the frame 17 of the apparatus 1 by means of distance holders 44 so that an adaptation to different sizes of poultry is possible. The stripper plates 43 extend parallel to the corresponding conveyor track section and have in cross-section a curved shape and have, starting from the scraping device 37 of the first scraping apparatus 13, a width increasing stepwise in parallel with the longitudinal plane of the carrying element 3 as appears clearly from FIG. 1.

Moreover, the stripper plates 43 each are provided with a recess 45 wherein, next to each stripper plate 43, a pivotable scraping rod 46 is placed. The free ends of the scraping rods 46 are movable into the recesses 45 of the corresponding stripper plates 43 and can engage upon the sides of the sternum to loosen the breast flesh. The scraping rods 46 are pivotally mounted on frame 17 in bearings 47 and are pivotable by means of piston devices 48 that are also secured to the frame 17. The motion of the scraping rods 46, caused by these piston devices, is illustrated schematically in FIG. 7, in which the dotted position illustrates another position of the scraping rods 46 relative to the stripper plates 43.

Finally, beyond the scraping rods 46 and below the stripper plates 43, the cutting-loose device 15 is positioned and consists of two endless chains 50 running in opposite directions around chain guides 49, that in FIG. 8 are schematically represented, said chains adjoining each other in the longitudinal plane of the corresponding carrying element 3, and moving away from the carrying element 3. These chains 50 are driven by sprocket chain wheels 51 that by means of a chain 52 are connected with a gear box 53 that is driven by the chain 16. This cutting-loose device 15 severs the breast flesh from the lower side of the sternum of the carcass.

The operation of the apparatus according to FIG. 1 will be explained further with reference to the FIG. 9 to 20.

After the carcass 54 that is carried by the carrying element 3 has passed the guiding-cutting assembly 5 it has at both sides of the backbone two cuts 55, as appears clearly from FIG. 9. The carcass 54, so provided with two cuts 55, is moved along the skinning apparatus 11 where the skin is removed. During the progression of the carrying element 3 along the conveyor track 2 the guides 28 engage the portion of the carcass being positioned at the lower side. The cutting die 22 is in the position shown in FIG. 2 so that it is moved into the neck-opening of the carcass 54 when the carcass moves along the conveyor track 2. When the cutting die 22 has abutted the top 56 of the clavicle 57, the progression of the carcass makes sure that the processing device 12 is moved together with the carcass against the spring load of the spring 27. During this motion the carrying arm 21 is pivoted downwardly by the piston device 24 and the piston rod 25 so that the cutting die 22 is moved downwardly. As a result the top 56 of the clavicle 57 is pulled in the direction of the counter-knife 26 and removed. FIG. 9 and 10 show the carcass just before this happens. After the carcass has passed the processing device the cutting die 22 is moved upwardly again.

Figures 11, 12:
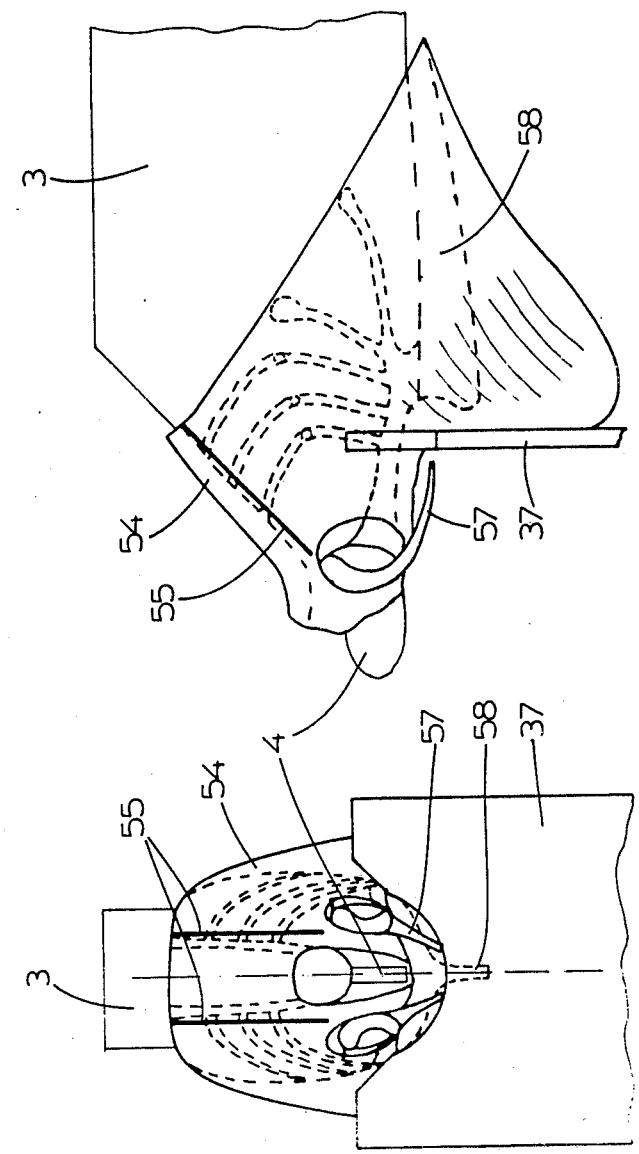
FIGS. 11 and 12 show the operation of the first scraping device according to FIG. 4 and 5.

FIG. 11 and 12 show the scraping device 37 of the first scraping apparatus 13. Because the top 56 of the clavicle 57 has been removed scraping device 37 pushes the remaining parts of the clavicle upwardly so that all flesh positioned between the clavicle and the sternum 58 of the carcass 54 can be removed. The scraping device 37 is moved by the piston rod 40 in such a way that the scraping device 37 is moved downwardly immediately after reaching the position shown in FIG. 12 so that this scraping device 37 does not touch the sternum 58 or hardly does so.

Just before the scraping device 37 engages the carcass 54, the guiding devices 34 are placed in the position shown in FIG. 4 and 5. Thereafter, the guiding devices 34 are moved inwardly by the piston devices 32 into the direction of the carcass 54 until they press the carcass 54 firmly against the carrying element 3. Thereby, the operation of the scraping device 37 is improved. After the carcass 54 has passed the guiding devices 34, these guiding devices are returned to their starting position.

Figure 16:
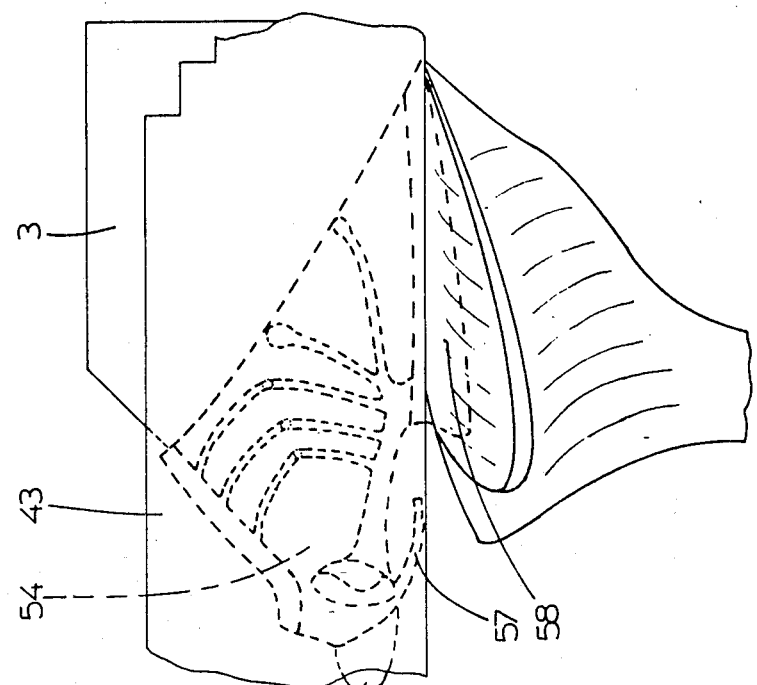
Figure 15:
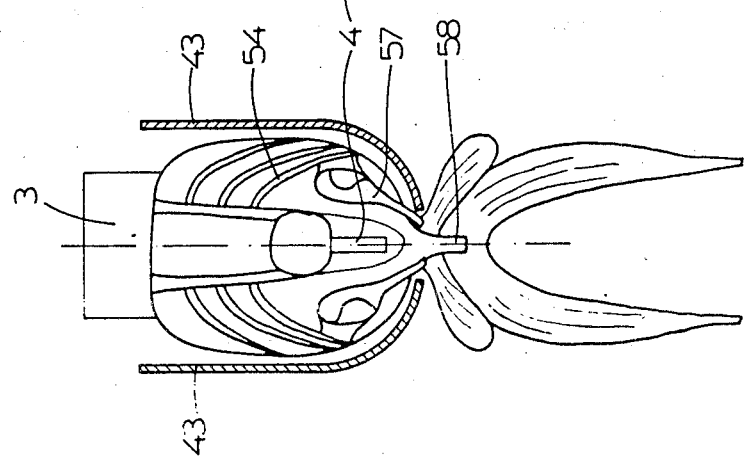

After the carcass 54 has passed the first scraping apparatus 13, it reaches the second scraping apparatus 14 and the stripping plates 43. Stripping plates 43 force themselves between the carcass 54 and the flesh wherein the stepped shape of the stripping plates 43 ensures the simple cutting-loose of several pellicles of the carcass 54. The curved shape of the stripping plates 43 is adapted to the shape of the carcass 54 so the part of the breast flesh that is above the sternum 58 is cut loose effectively. FIG. 15 and 16 show the position of the stripping plates 43 wherein the breast flesh suspends from the sternum 58.

When, during the progression of the carrying element 3, the sternum 58 reaches the recesses 45 in the stripping plates 43, the scraping rods 46 engage the sides of the sternum 58 so that the breast flesh is also severed from the sides of the sternum 58 and is only connected with the lower side of sternum 58. The scraping rods 46 are placed in the position represented in dots in FIG. 7, until the sternum has reached the recesses 45, whereafter the piston devices 48 move the scraping rods 46 with their ends into the recesses 45. After the sternum 58 has passed the recesses 45 in the stripping plates 43, the scraping rods are returned to their starting position.

Finally, the carcass 54 reaches the cutting-loose device 15, wherein the chains 50 sever the breast flesh from the lower side of the sternum. From FIG. 1 and FIG. 20 it appears clearly that the chains 50 extend at a sharp angle with the conveyor track 2. Thereby the operation of these chains 50 is influenced favourably.

After the carcass 54 has passed the cutting-loose device 15 the breast flesh is severed totally from the carcass and it can be removed by a (not shown) conveyor device. The carcasses 54 are then removed from the carrying elements 3 (in a way not shown), said carrying element after cleaning being ready again to pick up another carcass.

The second embodiment of the apparatus according to the invention shown in FIG. 21 is, as far as the processing device 12, identical with the apparatus shown in FIG. 1. However, the first scraping apparatus 59 and the second scraping apparatus 60, together with the cutting-loose device 61, differ from the embodiment according to the apparatus in FIG. 1.

The first scraping apparatus 59 is formed by scraping rolls 62 positioned at both sides of the corresponding carrying element 3. These scraping rolls 62 are by means of conical gear wheels 63 (driven by a driving device not shown) and sever the portion of the breast flesh from the carcass that is farthest from the sternum. The axis of each scraping roll 62 extends in a plane that is in parallel with the longitudinal plane of the carrying element 3 and is inclined relative to the transport direction. The relative distance between the scraping rolls is adapted to the width of the carcasses to be processed.

Beyond the scraping rolls 62 a second scraping apparatus 60 is provided that comprises two stripping plates 64 that are positioned at both sides of the corresponding carrying element 3 and that extend in parallel with the corresponding conveyor track section, said plates having in cross-section a curved shape and having the same function as the stripping plates 43 described before. These stripping plates 64 comprise, at their side facing the scraping rolls 62, a plate section 65 that is pivotable around an axis 66 that extends in a plane transverse to the plane of the carrying element 3 and extend at an angle with the longitudinal plane thereof, between a first position in which the plate section 65 extends in alignment with the corresponding stripping plate 64 and a second position in which the plate section 65 projects outwardly from the carrying element 3. The plate sections 65 have a width increasing stepwise in parallel with the longitudinal plane of the carrying element 3 starting from the scraping rolls 62.

The motion of the plate sections 65 relative to the stripping plates 64 is obtained by a piston device 67 that is connected with the plate section 65 by means of a jib 68.

The cutting-loose device 61 that is shown in FIG. 26 and FIG. 21 exists of two endless chains 70 running in opposite directions around chain guides 69, said chains adjoining each other in the longitudinal plane of the corresponding carrying element 3 and moving away from the carrying element 3, and a strip shaped device 71, provided beyond these chains. The end of the strip shaped device 71 facing the carrying element 3 is provided with a cylindrical part 72 wherein the strip shaped device is movable to and fro by means of a piston device 73. The chain sections 74 that are positioned in the longitudinal plane of the carrying element 3 as well as the strip shaped device 71 extend at a sharp angle with the forward transport direction so that a good operation of the cutting-loose device 61 is obtained. The function of the cutting-loose device 61 is identical with the function of the cutting-loose device 15 described before already. Moreover, the chain guides 69 cooperating with the chain sections 74 that are positioned in the longitudinal plane of the carrying element 3 are provided with recesses 75 that are positioned at the contact plane with these chain sections 74 so that these chain sections 74 obtain some flexibility and can adapt themselves to the shape of the severed breast flesh.

The operation of the apparatus according to FIG. 21 will hereafter be explained further with reference to FIG. 27 until 30.

The carcass 54 shown in FIG. 27 has two cuts 55, that are made by the guiding-cutting assembly 5. During the progression of the carrying element 3 and the carcass 54 the scraping rolls 62 engage the carcass and remove that part of the flesh that is positioned behind the cuts 55. Because the scraping rolls 62 include an angle with the transport direction the flesh is removed effectively and assumes the position shown in FIG. 27, in which the flesh suspends sidewardly from the carcass 54.

After the carcass 54 has passed the scraping rolls 62, it reaches the second scraping apparatus 60. During the approach of the carcass 54 the plate sections 65 are directed outwardly from the carrying element 3 extend at an angle with the stripping plates 64. Next, the plate sections 65 are pivoted inwardly by the piston devices 67 so that the stepped plate sections 65 force themselves between the breast flesh and the carcass 54. Due to the stepped shape of the plate sections 65 the pellicles of the carcass are cut through effectively during the progression thereof and the flesh that is positioned above the sternum 58 is severed. This operation is shown in FIG. 28.

After the greatest part of the breast flesh has so been severed, the carcass 54 passes the cutting-loose device 61. As appears from FIG. 29 the chains 70 engage upon the sides of the sternum 58 and remove the breast flesh therefrom. At the same time the cylindrical part 72 of the strip shaped device 71 engages upon the lower side of the sternum 58 (FIG. 30) so that there also the breast flesh is severed from the carcass 54. The strip shaped device 71 does not move upwardly in the direction of the sternum until the sternum 58 is positioned above the cylindrical part 72 of the strip shaped device 71. For this purpose, the piston device 73 is activated.

The motions of the different piston devices that are applied in the embodiments of the apparatus according to the invention discussed here, run synchronously with the motion of the carrying elements 3 along the conveyor track 2. For this reason proximity switches that are not shown are placed next to the conveyor track 2, said switches activating the piston devices.

The invention is not limited to the embodiments described above, but can be varied widely within the scope of the invention.

I claim:

1. An apparatus for removing the breast flesh from poultry carcasses, comprising:
   a conveyor track;
   carcass carrying elements, movable along said conveyor track, for conveying carcasses;
   a process device for removing the top of the clavicle of the carcass; and
   means for separating the breast flesh from the carcass after the top of the clavicle is removed.

2. An apparatus according to claim 1, wherein the processing device comprises a cutting device that is movable between a first position wherein the cutting device is positioned between said carrying element and the top of the clavicle and a second position wherein the cutting device is positioned at the side of the clavicle that faces away from the carrying element.

3. An apparatus according to claim 2, wherein the cutting device comprises a cutting die that cooperates with a counter-knife which, during the cutting operation, is positioned at the side of the clavicle that faces away from the carrying element, said counter-knife being provided with an opening thiough which the cutting die and the top of the clavicle may pass.

4. An apparatus according to claim 3, wherein the cutting die and the counter-knife are supported on a carriage that is reciprocatable in parallel with the adjacent conveyor track section.

5. An apparatus according to claim 4, wherein said carriage is provided with a resilient device that urges the carriage in a direction opposite to the direction said carrying element is moving.

6. An apparatus according to claim 4, wherein the cutting die is disposed on a carrying arm that is mounted on the carriage for pivoting movement in a longitudinal plane of the carrying element.

7. An apparatus according to claim 2, wherein the cutting device is reciprocated by means of a piston device.

8. An apparatus according to claim 1, wherein the separating means comprises a first scraping device extending, at least, along the width of said carrying element and being reciprocatable along the longitudinal plane of said carrying element, from and towards the carrying element, and having, at its end facing the carrying element, a rounded opening.

9. An apparatus according to claim 8, wherein the scraping device comprises a flat plate.

10. An apparatus according to claim 9, wherein the scraping device is reciprocatable by means of a piston device.

11. An apparatus according to claim 8, wherein the separating means further comprise two guide elements disposed along the sides of the carrying element and extending substantially parallel with the adjacent conveyor track, said guide elements being reciprocatable between a first position in which the guide elements are positioned very close to the carrying element and a second position in which the guide element are positioned at a greater distance from the carrying element.

12. An apparatus according to claim 11, wherein the guide elements are supported on carriages that are movable along a guide.

13. An apparatus according to claim 12, wherein the carriages are each movable by means of a piston device.

14. An apparatus according to clsaim 11, wherein the separating means further comprise two stripper plates disposed along the sides of the carrying element and extending parallel to the adjacent conveyor track section, said stripper plates having a curved cross-sectional shape.

15. An apparatus according to claim 14, wherein the stripper plates have a width which increases stepwise substantially in parallel with the longitudinal plane of the carrying element.

16. An apparatus according to claim 14, wherein the distance between the carrying element and the stripper plates is adjustable.

17. An apparatus according to claim 14, wherein the stripper plates are each provided with a recess and, disposed adjacent to each stripper plate, is a pivotable scraping rod having a free end which is movable into the recess of the adjacent stripper plate.

18. An apparatus according to claim 17, wherein the scraping rods are pivotable by means of piston devices.

19. An apparatus according to claim 17, wherein a cutting-loose device is placed below the stripper plates.

20. An apparatus according to claim 19, wherein the cutting-loose device comprises two endless chains running in opposite directions around chain guides, said chains interlocking with each other in the longitudinal plane of the adjacent carrying element and moving away from the carrying element.

21. An apparatus according to claim 20, wherein the chain sections are positioned in the longitudinal plane of the carrying element at a sharp angle to the forward transporting direction.

22. An apparatus according to claim 1, wherein the separating means comprise a pair of scraping rolls disposed along both sides of the adjacent carrying element.

23. An apparatus according to claim 22, wherein the axes of each scraping roll is positioned in a plane extending in parallel with the longitudinal plane of the carrying element and has an inclined orientation relative to the conveyor direction.

24. An apparatus according to claim 22, wherein the separating means further comprise two stripping plates disposed along two sides of the carrying element and substantially parallel to the the adjacent conveyor track section, said stripping plates having a curved cross-sectional shape and comprising a plate section that is pivotable around an axis that lies in a plane transverse to the longitudinal plane of the carrying element and extends at an angle with a longitudinal plane thereof, said plate section being pivotable between a first position in which the plate section extend in alignment with the adjacent stripper plate and a second position in which this plate section projects outwardly from the carrying element.

25. An apparatus according to claim 24, wherein the plate sections have a width increasing stepwise in parallel with the longitudinal plane of the carrying element.

26. An apparatus according to claim 24, wherein the stripper plates are provided with a recess in which the end of a cutting-loose device is positioned.

27. An apparatus according to claim 26, wherein the cutting-loose device comprises two endless chains running in opposite directions around chain guides, said chains interlocking with each other in the longitudinal plane of an adjacent carrying element and moving away from said carrying element.

28. An apparatus according to claim 27, wherein the chain sections are positioned in a longitudinal plane of the carrying element and extend at a sharp angle with the forward transport direction.

29. An apparatus according to claim 28, wherein a strip-shaped device is reciprocated by a piston device.

30. An apparatus according to claim 29, wherein the end of the strip-shaped device facing the carrying element, is provided with a cylindrical part.

31. An apparatus according to claim 27, wherein the chain guides cooperating with the chain sections disposed in a longitudinal plane of the carrying element, comprise chain guide plates which, at the contact plane of said chain sections, are provided with recesses.

32. A method fdr removing the breast flash from a poultry carcass, comprising the following steps:
conveying said carcass;
removing the top of the clavicle of said carcass; and
severing the breast flesh from said carcass.

* * * * *